United States Patent
Fleury

(10) Patent No.: US 9,607,441 B2
(45) Date of Patent: Mar. 28, 2017

(54) MORPHOLOGICAL ATTRACTOR FOR CREATING CUSTOM ANCESTORS IN INHERITANCE-BASED CHARACTER GENERATION

(71) Applicant: AUTODESK, Inc., San Rafael, CA (US)

(72) Inventor: Michel Fleury, Montreal (CA)

(73) Assignee: AUTODESK, INC., San Rafael, CA (US)

( * ) Notice: Subject to any disclaimer, the term of this patent is extended or adjusted under 35 U.S.C. 154(b) by 495 days.

(21) Appl. No.: 14/043,269

(22) Filed: Oct. 1, 2013

(65) Prior Publication Data

US 2014/0092090 A1      Apr. 3, 2014

Related U.S. Application Data

(60) Provisional application No. 61/708,857, filed on Oct. 2, 2012.

(51) Int. Cl.
  *G06T 19/20*     (2011.01)
  *G06T 15/50*     (2011.01)

(52) U.S. Cl.
  CPC ............ *G06T 19/20* (2013.01); *G06T 15/503* (2013.01); *G06T 2219/2021* (2013.01)

(58) Field of Classification Search
  None
  See application file for complete search history.

(56) References Cited

U.S. PATENT DOCUMENTS

| | | | |
|---|---|---|---|
| 6,545,682 B1* | 4/2003 | Ventrella ................. | G06T 17/00 345/473 |
| 2008/0316227 A1* | 12/2008 | Fleury ................. | G06F 3/04847 345/630 |
| 2009/0213138 A1* | 8/2009 | DeRose .................. | G06T 17/20 345/619 |
| 2012/0309520 A1* | 12/2012 | Evertt ..................... | G06T 19/20 463/31 |

* cited by examiner

*Primary Examiner* — James A Thompson
(74) *Attorney, Agent, or Firm* — Artegis Law Group, LLP

(57) ABSTRACT

Techniques are disclosed for creating and customizing graphical models. In one embodiment, a design application receives a morphological attractor created from the same mesh as one or more inheritance-based character generation ancestor models. Upon receiving the morphological attractor, the design application may use the attractor to align and transform the ancestor models to create a new set of ancestor models which resemble the attractor. The new set of ancestor models is referred to herein as being in the "genetic space" of the attractor. A user may then create child character models in this same genetic space by, globally or locally, blending two or more of the new ancestor models.

22 Claims, 5 Drawing Sheets

MORPHOLOGICAL ATTRACTOR FOR CREATING CUSTOM ANCESTORS IN INHERITANCE-BASED CHARACTER GENERATION

CROSS-REFERENCE TO RELATED APPLICATIONS

This Application claims benefit of U.S. Provisional Patent Application Ser. No. 61/708,857 filed Oct. 2, 2012, which is incorporated herein by reference in its entirety.

BACKGROUND OF THE INVENTION

Field of the Invention

The present invention relates generally to computer graphics and, more specifically, to creating custom ancestors in inheritance-based character generation using morphological attractors.

Description of the Related Art

In inheritance-based character generation, child character models are created by blending morphological features imported from ancestor models. Blending may be performed globally, or in local regions of the character, with the percentage of blending defining a fundamental "DNA" of the new character. The fitting of clothing and accessories (eyes, teeth, wigs . . . ) may also be automatically adjusted based on this "DNA." The child characters generated by such blending may be full three-dimensional (3D) characters having skeletons, facial expressions, and balanced skin weights, among other things. Techniques which may be used in inheritance-based character generation are disclosed by, e.g., U.S. Patent Application No. 2008/0303830 entitled "Automatic Feature Mapping in Inheritance-based Avatar Generation," U.S. Patent Application No. 2008/0316227 entitled "User Defined Characteristics for Inheritance-based Avatar Generation," U.S. Patent Application No. 2008/0309675 entitled "Metadata for Avatar Generation in Virtual Environments," U.S. Patent Application No. 2008/0303829 entitled "Sex Selection in Inheritance-based Avatar Generation," and U.S. Patent Application No. 2008/0309677 entitled "Dynamic User Interface for Inheritance-based Avatar Generation," which are hereby incorporated by reference in their entirety.

Inheritance-based character generation techniques typically require ancestor models to have the same meshing so that their morphological features can be blended. Such techniques may further require ancestor models to be sufficiently aligned (e.g., having aligned mouths, eyes, facial expressions, body parts, etc.) so that local blending in definite zones (e.g., body zones, facial zones, arms, legs, hands, feet, etc.) will not create aberrations. In addition, such techniques often require a setup which allows facial expressions, balanced skin weights, clothing, etc. to be adjusted to fit child character models.

Given these limitations, software modeling tools typically provide predefined ancestors having the same meshing, alignment, and setup to users. For example, the publicly available Evolver tool provides a set of realistic virtual human ancestors. At the same time, users are typically unable to add their own ancestor models having different meshing, alignment, and setup for blending. For example, a user may be unable to add, as an ancestor, a cartoonish model with a disproportionately large head where the predefined ancestor models have normal human proportions. The child character models created from available ancestor models are likewise limited, as they can only be created by blending the predefined ancestors.

SUMMARY OF THE INVENTION

One embodiment of the present invention sets forth a method for creating custom three-dimensional (3D) models. The method generally includes receiving a morphological attractor comprising a 3D model used to influence the shapes of one or more predefined ancestor 3D models through a topological transformation. The method further includes aligning the plurality of predefined ancestor models by applying the morphological attractor to the predefined ancestor models, thereby creating a second set of ancestor models. In addition, the method includes blending at least two of the ancestor models in the second set of ancestor models according to user-specified blending settings.

Another embodiment sets forth a second method for creating custom three-dimensional (3D) models. The method generally includes receiving a custom character model, the custom character model having a topology different from a topology of predefined ancestor models. The method further includes mesh matching the custom character model with the predefined ancestor models, where the mesh match is used as a morphological attractor, and generating custom ancestor models in the topology of the custom character model by applying the morphological attractor to the predefined ancestor models and performing proximity calculations. The method further includes blending at least two of the custom ancestor models according to user-specified blending settings.

Other embodiments include computer-readable media that include instructions that enable a processing unit to implement one or more aspects of the disclosed methods as well as systems configured to implement one or more aspects of the disclosed methods.

BRIEF DESCRIPTION OF THE DRAWINGS

So that the manner in which the above recited features of the invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION OF EXEMPLARY EMBODIMENTS

Embodiments disclosed herein are directed to creating and customizing virtual characters from a library of such characters integrated with a design software application. In one embodiment, a morphological attractor may be created from the same mesh as that of predefined ancestors. As used herein, an "ancestor" refers to a 3D character model which may be blended, either globally or locally, with other ancestors to generate child character models. For example, a Greek nose of one ancestor may be blended with a Roman nose of another ancestor to produce the nose of a child character model that is in between these nose types. Ancestors in one embodiment may include, e.g., various models representing individuals of both sexes, and may also include extensions of shapes that go outside the standard human. As used herein, an "attractor" may refer to a 3D model used to influence the shape of other 3D models through a topological transformation. In one embodiment, the topological transformation process may align the principal morphological features of an ancestor (e.g., hands, feet, shoulder, waist, eyes, mouth, ears, etc.) to enable local blending without geometry disruptions in overall smoothness. The process may also try to maintain features of the original ancestors through the transformation. The design application may use such morphological attractors, which may be provided by a user, to align and transform predefined ancestors, thereby creating a new set of ancestors which resemble the attractor in terms of shape, proportion, etc. The alignment may generally be performed so that local blending does not create breaks in the geometry of blended ancestors. The new set of ancestors resembling the attractor is generally referred to as being in the "genetic space" of the attractor. Given the new set of ancestors, a user may create child character models in the same genetic space by blending such ancestors.

In one embodiment, the design application may receive a user-supplied custom character model and mesh-match the custom model with predefined ancestor meshes. This mesh match may be used as a morphological attractor. The design application may then generate custom ancestor models in the topology of the custom model by applying the morphological attractor to the predefined ancestor models and performing proximity calculations. The new ancestors may also be blended to create child character models.

Figure 1:
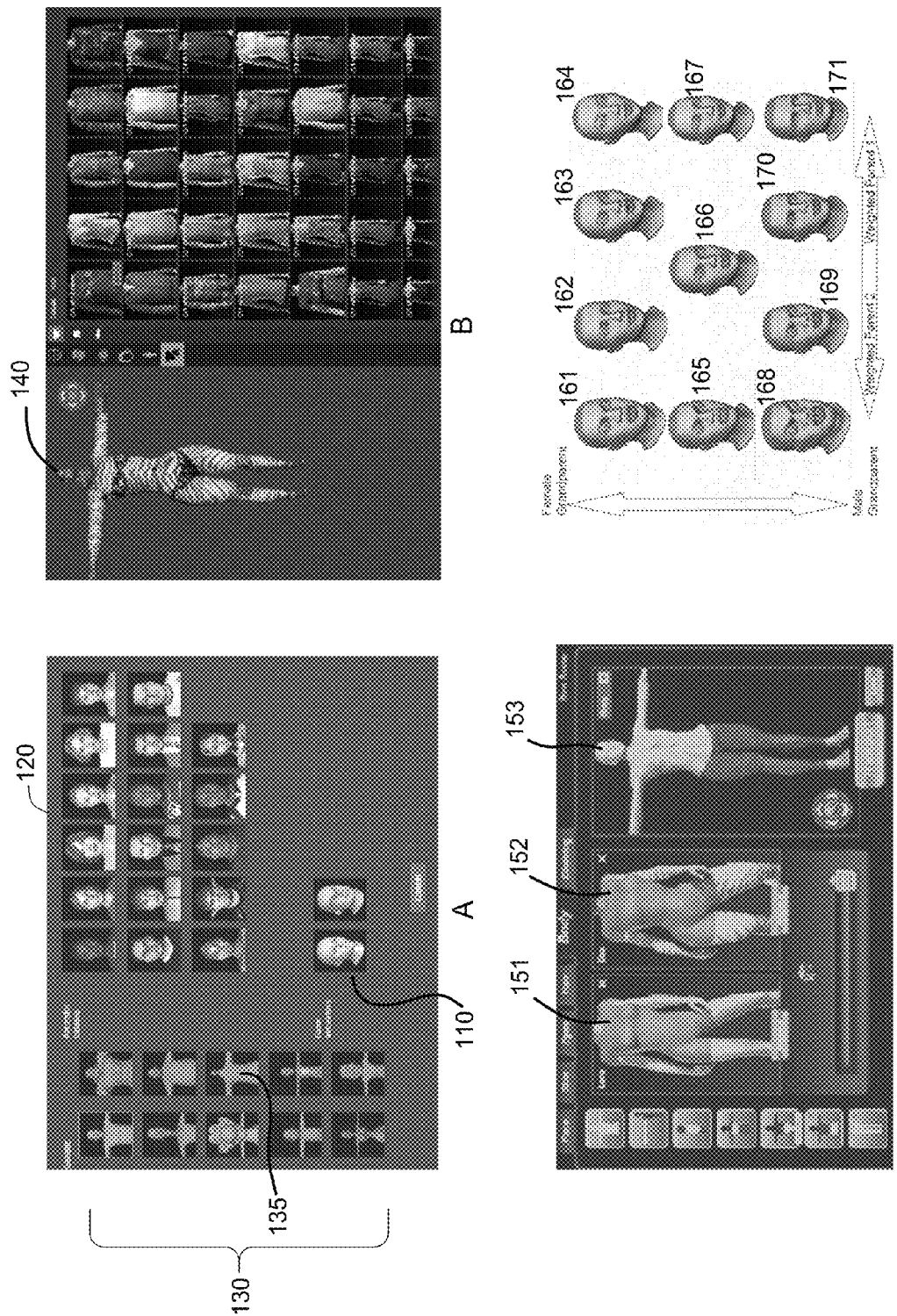
FIG. 1 illustrates an approach for creating custom ancestor models using attractors and blending said models, according to an embodiment.

FIG. 1 illustrates an approach for creating custom ancestor models using attractors and blending said models, according to an embodiment. Panel A also shows base ancestors 110 and intermediate ancestors 120. As discussed, an "ancestor" refers to a 3D character model which may be blended, either globally or locally, with other ancestors to generate child character models. The child character models may themselves be ancestors to other child character models. The base ancestors 110 represent the most fundamental ancestors, from which all other ancestors and child character models are created. While only two base ancestors 110 are shown, in general, any number (e.g., 45) of base ancestors may be used. In contrast, the intermediate ancestors 120 may be child character models, created by blending base ancestors 110. The intermediate ancestors 120 may themselves be blended to create additional child character models, which are "grandchildren" of the base ancestors 110.

Panel A also shows a plurality of attractors 130 presented on a user interface. As discussed, an "attractor" generally refers to a 3D model used to influence the shape of other 3D models through a topological transformation process. In one embodiment, the transformation process aligns the principal morphological features of an ancestor to enable local blending without geometry disruptions in overall smoothness, while also maintaining features of the original ancestors through the transformation. Such attractors capture the artistic signature of a user-supplied model, including body shapes, proportions, and the like, which may be different from those of predefined ancestor models. Applying an attractor may, e.g., extrude out or add extra layers, features, etc. to a 3D model. Continuing the example from above, a "Pinocchio" attractor may be applied to a blended Greek-Roman nose, resulting in an elongated and linearly-shaped Greek-Roman nose. Illustratively, one attractor 135, referred to herein as "Botero," has a small head, hands, and feet relative to its other body parts.

Panel B shows the results of applying the "Botero" attractor 135 to one of the base ancestors 110, resulting in an ancestor 140 in the genetic space of "Botero." As a result, the ancestor 140 also possesses the characteristics of a small head, hands, and feet. Body parts of the ancestor 140 may generally be aligned with the "Botero" attractor, while some morphological features of the ancestors 110 may be preserved. Although only one attractor is shown as being applied, more than one attractor may be applied because they have the same topology, so any global mix of attractors results in a new attractor.

In one embodiment, a user may specify percentages contributed by each of a plurality of attractors (e.g., 50% of each of attractors 1 and 2). These attractors may then be morphed together globally according to the contribution percentages, before being applied to ancestor models. The resulting ancestor models may then resemble, including in alignment, the contributing attractors according to their respective contribution percentages. Even in the case of a single attractor, the influence of the attractor may be specified by the user, and the design application may apply the attractor according to this specified influence. In one embodiment, the intensity of attraction may be used to control the proximity with which the resulting mesh matches any given attractor. This intensity may be controlled globally or locally in some embodiments. For example, for a given artistic style, a user may decide that a nose should be close to a sphere and not permit a strong attraction to all other nose types.

Applying an attractor to an ancestor may be computationally expensive. In one embodiment, the attractor may be applied to ancestors in a pre-computation step. For example, a user may upload a desired attractor to an external server responsible for generating custom ancestors and the external server then applies the attractor to the ancestors. Thereafter, the external server returns the resulting new ancestors, which may then be stored for later use in blending. In some cases, a user may manually retouch the new ancestors where the attractor transformation is, e.g., large and does not sufficiently align the ancestor with the attractor.

Panel C shows an ancestor 152, which corresponds, in the standard genetic space, to the one shown in "Botero" genetic space 140. The difference in the representation may be appreciated. Ancestor 152 may be blended with another ancestor 151 which is in the "Botero" genetic space or any other genetic space generated by a morphological attractor, to create child character model 153. Illustratively, the bodies of ancestors 151, 152 are blended, although other local or global blending may also be performed. Panel D shows a range of blending possibilities 161-171 when blending the head of ancestor characters, such as ancestors 151, 152. In one embodiment, the design application may provide, e.g., a graphical user interface (GUI) slider which gives a range of options for weighting the percentage to which the ancestors contribute to the blended model. Illustratively, character 168 may be created by weighting parent 2 more heavily than parent 1, while character 171 may be created by weighting parent 1 more heavily than parent 2. As discussed, in inheritance-based character generation, the percentage of blending may define a unique DNA of the new character, and the fitting of clothing, accessories (eyes, teeth, wigs . . . ), among other things may be automatically adjusted based on this DNA.

Figure 2:
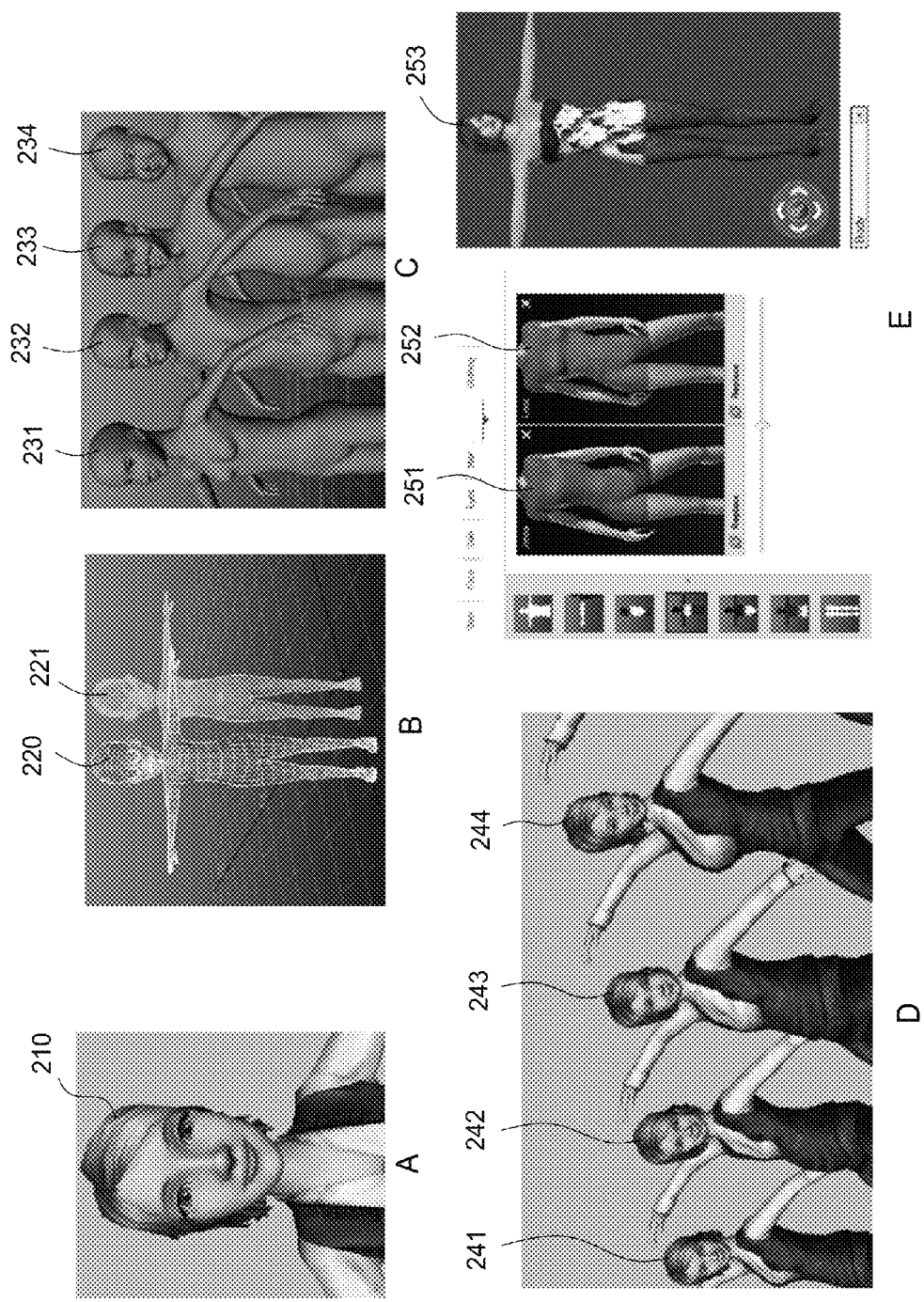
FIG. 2 illustrates an approach for creating custom ancestor models having user-supplied mesh topology and blending said models, according to an embodiment.

FIG. 2 illustrates an approach for creating custom ancestor models having user-supplied mesh topology and blending said models, according to an embodiment. As shown in panel A, a user-supplied character model 210 may include a unique topology and overall look given the shapes, proportions, etc. of the model 210. As discussed, the model 210 may not be aligned with the predefined ancestor models.

As shown in panel B, a mesh-match is made between a mesh of the custom model 221 and that of ancestor mesh 220. Any feasible mesh-match technique may be used. Examples of mesh-match techniques include W.-C. Ma, and J. P. Lewis, "A guided synthesizer for blendshape characters," in ACM SIGGRAPH 2012 Talks, Los Angeles, Calif., 2012; M. Ovsjanikov, M. Ben-Chen, J. Solomon et al., "Functional maps: a flexible representation of maps between shapes," *ACM Trans. Graph.*, vol. 31, no. 4, Article 30, 2012; C. Wang, M. M. Bronstein, A. M. Bronstein, and N. Paragios, "Discrete minimum distortion correspondence problems for non-rigid shape matching," in Proc. of Third international Conference on Scale Space and Variational Methods in Computer Vision, 2012, pp. 580-591; A. Dubrovina, and R. Kimmel, "Matching shapes by eigendecomposition of the Laplace-Beltrami operator.", in International Symposium 3D Data Processing, Visualization and Transmission, Paris, France, 2010; O. K.-C. Au, C.-L. Tai, D. Cohen-Or, Y. Zheng, and H. Fu, "Electors Voting for Fast Automatic Shape Correspondence," *Comput. Graph. Forum*, vol. 29, no. 2, pp. 645-654, 2010, which are hereby incorporated by reference in their entireties herein. The mesh-match technique may be implemented in, e.g., Maya Embedded Language (MEL) using a MEL script. As discussed in greater detail below, mesh matching may be useful for controlling the user-supplied character model 210 with the predefined ancestors.

As shown in panel C, the design application further creates new ancestors 231-234 associated with the received custom model by retargeting the ancestors to the shape of the user-supplied model 210. In one embodiment, the mesh-match may be used as a morphological attractor, permitting new ancestors to be created in either the new topology 241-244 or the usual topology 231-234. For example, suppose a new model "Sven" is received, which has a different topology than the usual topology of the predefined ancestors. The design application may mesh-match "Sven" with the usual topology. Call this Sven_Match. Sven_Match may be use as an attractor to align the predefined ancestors with Sven_Match. The process of alignment may create new ancestors for the genetic space of "Sven," in the usual topology of the predefined ancestors. With proximity calculations, the design application may also transform "Sven" itself, producing new aligned ancestors in the "Sven" topology.

Panel D, shows a set of ancestors 241-244 created using morphological attractors. In one embodiment, the design application may also transfer a rig to the new set of ancestors. In traditional inheritance-based character generation, a skeletal rig, including facial bones may be built from the geometry mesh. As a result of the mesh matching, discussed above, such rigs may be transferred to the new ancestors. Aside from transferring the rig, the design application may also transfer other attributes (facials expressions, clothing, etc.) of the custom model, if any. For example, clothing and accessories may be transferred through the same morphological attractor process used to create the new ancestors.

Panel E shows new ancestors 251, 252 being blended to create child character model 253. As discussed above, blending between ancestor models generally includes a user specifying blending percentages. The design application may then blend the ancestors according to the specified percentages.

Figure 3:
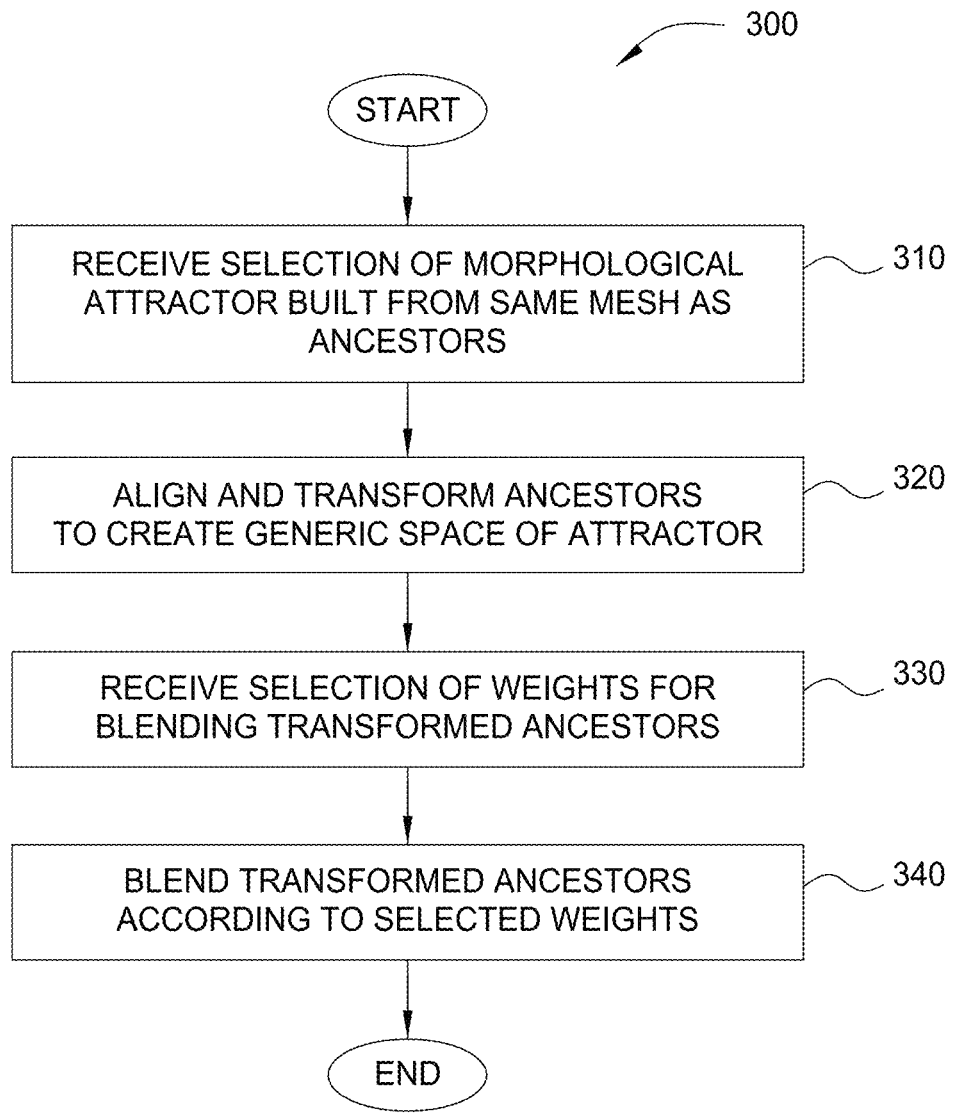
FIG. 3 illustrates a method for creating and blending ancestor models from a user-supplied attractor, according to an embodiment.

FIG. 3 illustrates a method 300 for creating and blending ancestor models from a user-supplied attractor, according to an embodiment. As shown, the method 300 begins at step 310, where a design application receives a selection of a morphological attractor built from a common mesh as an initial ancestor model (or models). For example, an artist may model a cartoonish attractor (e.g., the "Botero" character 135) using the mesh of the ancestor models, and place the attractor in a library. Another user may then select the attractor from the library to apply. As the attractor is readily available, the user, who may not be a skilled 3D modeler, need not personally model the cartoonish attractor.

At step 320, the design application aligns and transforms predefined ancestors to create a "genetic space" of the attractor. In one embodiment, the design application aligns and transforms the predefined ancestors by applying the attractor. By applying the attractor to the ancestors, characteristics of the attractor, including alignment of body parts such as eyes, mouth, facial expressions, etc., may be imparted to the ancestors, while preserving some morphological features of the ancestors. The resulting ancestors are in the "genetic space" of the attractor, as they are aligned with the attractor and may resemble the attractor to some extent.

As discussed, it may be computationally expensive to apply attractors to ancestors. In one embodiment, the design application may pre-compute and store the ancestors in the genetic space of the attractor. Doing so eliminates the need to perform the computationally-expensive operation of applying attractors to ancestors at runtime.

In another embodiment, multiple attractors may be applied to obtain the new ancestors. For example, a user may specify attractor contribution percentages for each of multiple attractors. In response, the design application morphs the attractors together globally according to the contribution percentages. The design application then applies the morphed attractors to the predefined ancestor models to build new ancestors which resemble, including in alignment, the contributing attractors according to their respective contribution percentages. Even in the case of a single attractor, the user may specify how strongly the attractor influences the output ancestors. In one embodiment, the intensity of attraction may control the proximity with which the resulting mesh matches any given attractor, either for a local zone or globally for the entire model.

Further, the attractor itself may be used as an ancestor, as the attractor has the same topology as the new ancestors and is aligned with the new ancestors. That is, the attractor may be used to not only create new ancestors, but as one of the ancestors. Note, in such a case, some manual retouching of facial expressions, skin weights, etc. of the attractor may be necessary.

In another embodiment, other features of the user-supplied attractor may be applied to the new ancestors. For example, the design application may change a texture of the skin of the new ancestors to be the same as that of the user-supplied attractor.

At step 330, the design application receives a selection of weights for blending the transformed ancestors. The weights may generally specify the percentages that each ancestor contributes to the child character. For example, in an implementation which allows blending between N ancestors, where N>2, a user may provide a weight $W_m$m for each ancestor m, where $\Sigma_{m=1}^{N} W_m=1$. At step 340, the design application blends the ancestors according to the selected weights. As previously noted, in inheritance-based character generation, the percentage of blending may define a unique DNA of the new character, and the fitting of clothing, accessories (eyes, teeth, wigs . . . ), among other things may be automatically adjusted based on this DNA.

Figure 4:
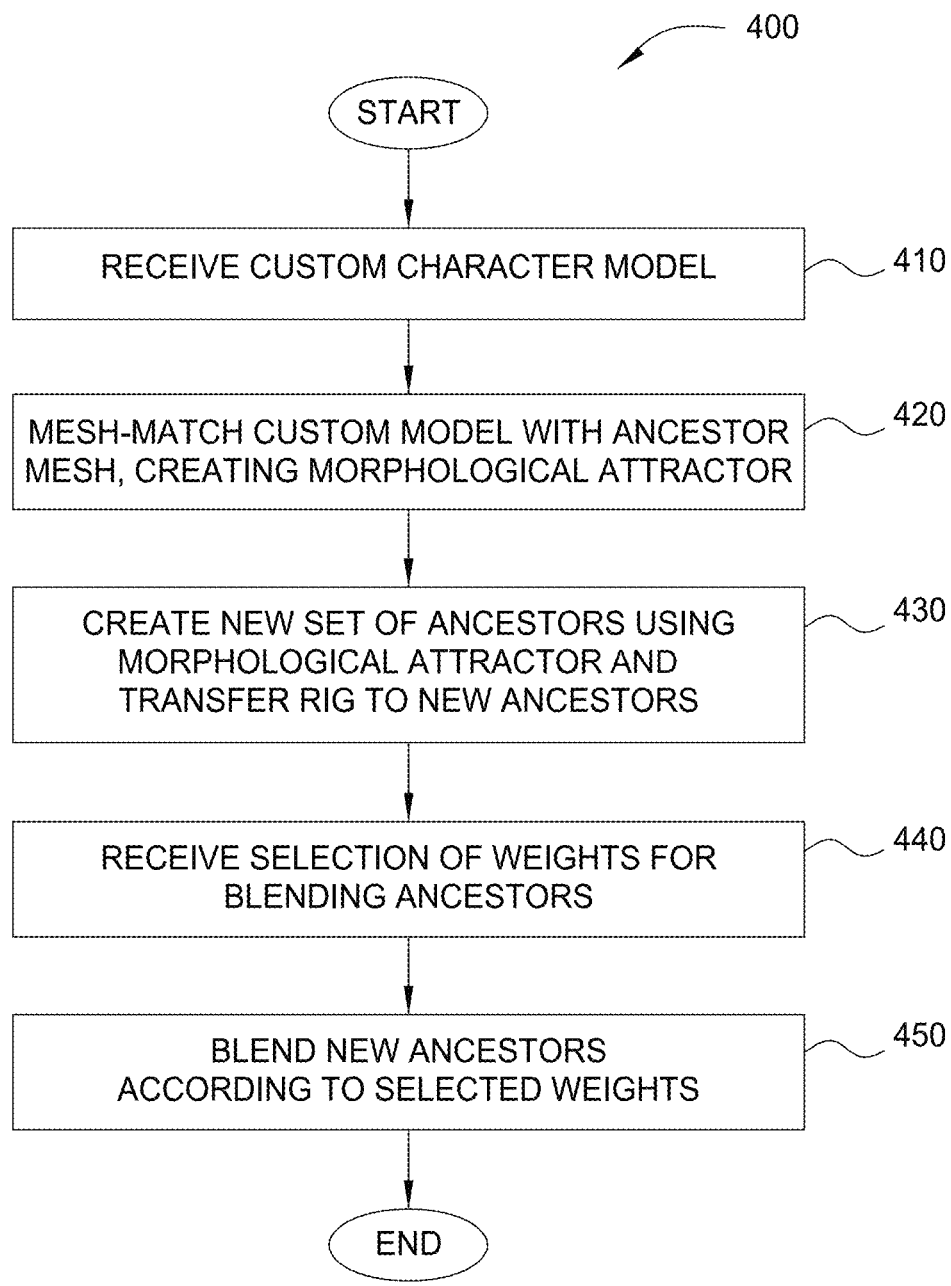
FIG. 4 illustrates a method for creating and blending ancestor models having user-supplied mesh topologies, according to an embodiment.

FIG. 4 illustrates a method 400 for creating and blending ancestor models having user-supplied mesh topologies, according to an embodiment. As shown, the method 400 begins at step 410, where a design application receives a custom character model. In contrast to the discussion above with respect to FIG. 3, the custom character model may have topology different from the topology of predefined ancestor models. This allows higher quality models, as the custom character model may have as much detail as desired, including their own accessories and costumes.

At step 420, the design application mesh matches the custom model with ancestors' meshes, creating a morphological attractor. In one embodiment, mesh matching may be performed in a balanced manner to cover the new topology of the custom model. Example mesh match techniques are discussed above. As further discussed, matching the custom model to the ancestors' mesh permits the custom model to be controlled by the ancestors' mesh.

At step 430, the design application creates new ancestors from the custom model using the morphological attractor. In one embodiment, the mesh-match may be used as the morphological attractor, permitting new ancestors to be created in either the new topology of the custom model or the usual topology of the predefined model. As discussed, if a new model "Sven" is received having a different topology than the usual topology of the predefined ancestors, the design application may mesh-match "Sven" with the usual topology. The mesh match may be used as an attractor to align the predefined ancestors with the match. The process of alignment may create new ancestors for the genetic space of "Sven," in the usual topology of the predefined ancestors. With proximity calculations, the design application may also transform "Sven" itself, producing new aligned ancestors in the "Sven" topology. In one embodiment, the design application transfers zones (e.g., body zones, facial zones, arms, legs, hands, feet, etc.) of the morphological attractors to the meshing of the new ancestors via proximity calculations. Doing so may allow local blending of the new ancestor meshes. Note, each new set of ancestors is a genetic space that can be blended to produce child character models. Working in parallel with both sets of ancestors may be useful in, e.g., creating crowd and secondary models.

The design application may apply any feasible alignment technique using the mesh-match which controls the topology of the custom model. In one embodiment, the predefined ancestor may be aligned with the custom model by essentially creating a non-perfect morph so as to retain as much as possible features which represent the "identity" of the ancestor while transforming the ancestor to align smoothly mouth, eyes, ears, hands, waist, feet, shoulder, etc. with those of the custom model. Normally when Model A is morphed to Model B, A becomes exactly B. In the non-perfect morph, the design application may compute an average of A and B so that the overall shape of A and B becomes more similar, while the details of their geometry is removed. Call those average SA and SB. A deformer, and more precisely a wrapper, may be attached between A and SA. Then, the design application may perform a classical morph between SA and SB, so SA becomes exactly SB. As a result, A through the wrapper will follow and go towards B. But A will not become perfectly B. Further, if zones are designated which are more constrained to go toward zones of B, then features may be aligned according to a user's preferences so as to preserve the identity of A to a desired degree.

In one embodiment, the morphological attractors may be applied to the predefined ancestors in a pre-computation step so as to avoid having to performing this computationally-expensive operation at runtime. For example, a server may run this pre-computation, and store the resulting new ancestors for consumption by user via a web interface. In another embodiment, more than one set of morphological attractors may be applied, according to user-specified contribution percentages. In yet another embodiment, one set of morphological attractors may be applied, but according to a user-specified level contribution percentage, similar to the discussion above with respect to FIG. 3. As discussed, the intensity of attraction may control the degree to which the resulting mesh matches any given attractor. This intensity may be controlled globally or locally in some embodiments.

Inheritance-based character generation techniques may be capable of building skeletal rigs, including facial bones from geometry meshes. In one embodiment, the design application may use the mesh-match determined at step 420 to transfer such rigs from the predefined ancestor models to the new ancestors. Skin weights and facial blend shapes, among other things, may also be transferred from the predefined ancestors to the new ancestors. Attributes such as facials expressions, clothing, etc. of the standard ancestors may also be transferred to the new ancestors. For example, clothing and accessories may be transferred through the same morphological attractor process used to create the new ancestors.

At step 440, the design application receives a selection of weights for blending new ancestors. Similar to the discussion above, the weights may generally specify the percentage of contribution of each ancestor to the child character model. Where N ancestors are available for blending, for example, the user may provide a weight $W_m$ for each ancestor m, where $\Sigma_{m=1}^{N} W_m=1$. Then, at step 450, the design application blends the new ancestors according to the selected weights.

Figure 5:
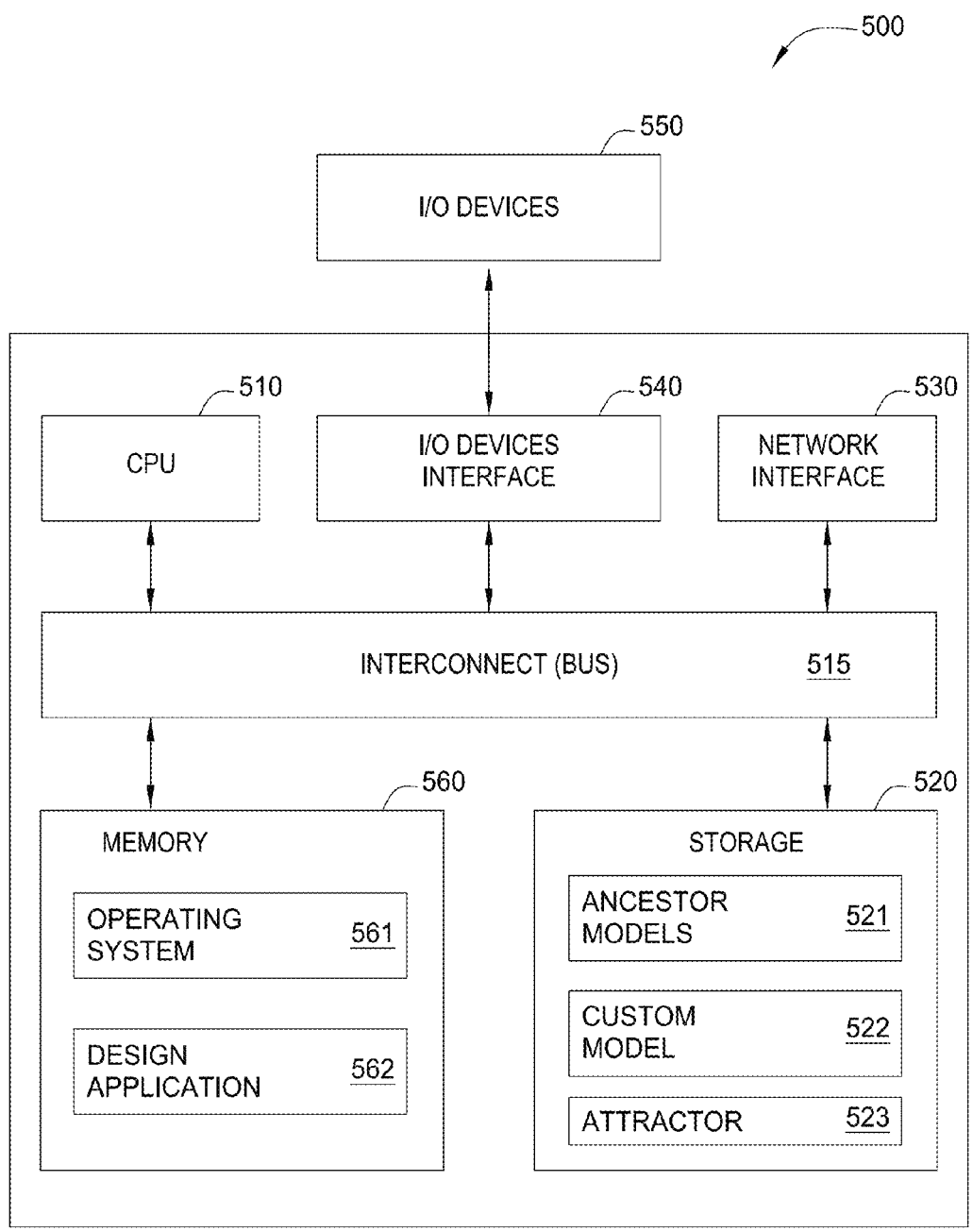
FIG. 5 illustrates a computer system configured to implement one or more embodiments.

FIG. 5 illustrates a computer system 500 configured to implement one or more embodiments. As shown, the system 500 includes, without limitation, a central processing unit (CPU) 510, a network interface 590, an interconnect 515, a memory 560, and storage 520. The system 500 may also include an I/O device interface 540 connecting I/O devices 550 (e.g., keyboard, display and mouse devices) to the system 500.

The CPU 510 retrieves and executes programming instructions stored in the memory 560. Similarly, the CPU 510 stores and retrieves application data residing in the memory 560. The interconnect 515 facilitates transmission, such as of programming instructions and application data, between the CPU 510, I/O device interface 540, storage 520, network interface 590, and memory 560. CPU 510 is included to be representative of a single CPU, multiple CPUs, a single CPU having multiple processing cores, and the like. In some embodiments, one or more programming instructions may instead be executed by a display processor, such as a graphic processing unit (GPU), instead of the CPU. And the memory 560 is generally included to be representative of a random access memory. The storage 520 may be a disk drive storage device. Although shown as a single unit, the storage 520 may be a combination of fixed and/or removable storage devices, such as fixed disc drives, floppy flash drives, removable memory cards or optical storage, network attached storage (NAS), or a storage area-network (SAN). Further, system 500 is included to be representative of a physical computing system as well as virtual machine instances hosted on a set of underlying physical computing systems. Further still, although shown as a single computing system, one of ordinary skill in the art will recognized that the components of the system 500 shown in FIG. 3 may be distributed across multiple computing systems connected by a data communications network.

As shown, the memory 560 includes an operating system 561 and a design application 562. The operating system may include, e.g., Microsoft's Windows®. The design application 562 is configured to build custom inheritance-based character generation ancestors using morphological attractors, and blend said ancestors to create child character models. In one embodiment, the design application 562 may be configured to receive a selection of a morphological attractor 523 built from the same mesh as that of predefined ancestors 521, align and transform the ancestors 521 to create new ancestors in a genetic space of the attractor, and blend the new ancestors in the genetic space of the attractor to create child character models, according to the method 300. In another embodiment, the design application 562 may be configured to receive a custom character model 522 having topology different from that of predefined ancestors 521, mesh-match the custom model with the predefined ancestors' 521 meshes, create a new set of ancestors using the mesh match as a morphological attractor, transfer the zones of the morphological attractor to the new ancestor meshes, and blend the new ancestors to generate child character models, according to the method 400. In one embodiment, the custom character model 522 may be stored in a library of such models in storage 520.

Although discussed above primarily with respect to humanoid characters, techniques disclosed herein are applicable to any type of characters and shapes, such as quadruped characters, other legged characters, non-character objects, etc.

Advantageously, embodiments presented herein permit user-supplied models, including models having different shapes, proportions, and even topology than that of predefined ancestors, to be used in creating new, custom ancestors which preserve at least some of the features and characteristics of the user-supplied models. Such custom ancestors may then be blended to create child character models. As a result, embodiments presented herein expand the range of possible characters created through inheritance-based character generation to include characters having diverse and even extreme faces, bodies, etc. which are not aligned with those of the predefined ancestors, as well as characters with high quality, detailed topologies. Further the user-supplied models may be created by an artist, and provided in a library such that users who are not skilled modelers or riggers may also use the models to build and blend custom ancestors to create high quality, rigged child characters.

Various embodiments of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments and numerous specific details are set forth to provide a more thorough understanding of the invention. Persons skilled in the art, however, will understand that various modifications and changes may be made thereto without departing from the broader spirit and scope of the invention. The foregoing description and drawings are, accordingly, to be regarded in an illustrative rather than a restrictive sense.

What is claimed is:

1. A computer-implemented method for creating custom three-dimensional (3D) models, comprising:
   receiving a morphological attractor comprising a 3D model having features not aligned with corresponding features of a set of predefined ancestor 3D models;
   aligning the features of the set of predefined ancestor models to the corresponding features of the morphological attractor by applying feature proportions of the morphological attractor to each of the predefined ancestor models to create a second set of ancestor models; and
   blending at least two of the ancestor models in the second set of ancestor models according to user-specified blending settings to create a child 3D model.

2. The computer-implemented method of claim 1, wherein the morphological attractor shares a common topology with the predefined ancestor models.

3. The computer-implemented method of claim 1, further comprising, adding the morphological attractor to the second set of ancestor models.

4. The computer-implemented method of claim 1, wherein the aligning of the predefined ancestor models is pre-computed on an external server, and wherein the second set of ancestor models are stored prior to the blending.

5. The computer-implemented method of claim 1, wherein the morphological attractor is applied according to a user-specified intensity of attraction value which controls a degree to which resulting meshes match the morphological attractor.

6. The computer-implemented method of claim 1, wherein the morphological attractor is retrieved from an online library of morphological attractors.

7. The computer-implemented method of claim 1, wherein the morphological attractor is obtained by globally morphing together two or more morphological attractors according to user-specified settings.

8. The computer-implemented method of claim 1, wherein the feature proportions of the morphological attractor are different than the feature proportions of the predefined ancestor models.

9. The computer-implemented method of claim 1, wherein the feature proportions of the second set of ancestor models resemble the feature proportions of the morphological attractor.

10. A non-transitory computer-readable storage media storing instructions, which when executed by a computer system, perform operations for creating custom three-dimensional (3D) models, the operations comprising:

receiving a morphological attractor comprising a 3D model having features not aligned with corresponding features of a set of predefined ancestor 3D models;

aligning the features of the set of predefined ancestor models to the corresponding features of the morphological attractor by applying feature proportions of the morphological attractor to each of the predefined ancestor models to create a second set of ancestor models; and blending at least two of the ancestor models in the second set of ancestor models according to user-specified blending settings to create a child 3D model.

11. The computer-readable storage media of claim 10, wherein the morphological attractor shares a common topology with the predefined ancestor models.

12. The computer-readable storage media of claim 10, the operations further comprising, adding the morphological attractor to the second set of ancestor models.

13. The computer-readable storage media of claim 10, wherein the aligning of the predefined ancestor models is pre-computed on an external server, and wherein the second set of ancestor models are stored prior to the blending.

14. The computer-readable storage media of claim 10, wherein the morphological attractor is applied according to a user-specified intensity of attraction value which controls a degree to which resulting meshes match the morphological attractor.

15. The computer-readable storage media of claim 10, wherein the morphological attractor is retrieved from an online library of morphological attractors.

16. The computer-readable storage media of claim 10, wherein the morphological attractor is obtained by globally morphing together two or more morphological attractors according to user-specified settings.

17. A system, comprising:
a processor; and
a memory, wherein the memory includes an application program that, when executed by the processor, configures the processor to create custom three-dimensional (3D) models by performing the steps of:
receiving a morphological attractor comprising a 3D model having features not aligned with corresponding features of a set of predefined ancestor 3D models, models to the corresponding features of the morphological attractor by applying feature proportions of the morphological attractor to each of the predefined ancestor models to create a second set of ancestor models, and
blending at least two of the ancestor models in the second set of ancestor models according to user-specified blending settings to create a child 3D model.

18. The system of claim 17, wherein the morphological attractor shares a common topology with the predefined ancestor models.

19. The system of claim 17, the operations further comprising, adding the morphological attractor to the second set of ancestor models.

20. The system of claim 17, wherein the morphological attractor is retrieved from an online library of morphological attractors.

21. The system of claim 17, wherein the morphological attractor is applied according to a user-specified intensity of attraction value which controls a degree to which resulting meshes match the morphological attractor.

22. A computer-implemented method for creating custom three-dimensional (3D) models, comprising:
receiving a custom character model, the custom character model having a topology different from a topology of predefined ancestor models;
mesh matching the custom character model with the predefined ancestor models, wherein the mesh match is used as a morphological attractor having a set of features not aligned with corresponding features of the predefined ancestor models;
aligning the features of the predefined ancestor models to the corresponding features of the morphological attractor by applying feature proportions of the morphological attractor to each of the predefined ancestor models to create custom ancestor models; and
blending at least two of the custom ancestor models according to user-specified blending settings to create a child 3D model.

* * * * *

UNITED STATES PATENT AND TRADEMARK OFFICE
CERTIFICATE OF CORRECTION

PATENT NO.        : 9,607,441 B2
APPLICATION NO.   : 14/043269
DATED             : March 28, 2017
INVENTOR(S)       : Michel Fleury Page 1 of 1

It is certified that error appears in the above-identified patent and that said Letters Patent is hereby corrected as shown below:

In the Claims

Column 12, Claim 17, Line 1, before the words "models to the", please insert --aligning the features of the set of predefined ancestor--

Signed and Sealed this
Fifth Day of December, 2017

Joseph Matal
*Performing the Functions and Duties of the*
*Under Secretary of Commerce for Intellectual Property and*
*Director of the United States Patent and Trademark Office*